July 10, 1956
A. B. SABIN
2,753,827
SHIP HATCH COVER STRUCTURE
Filed Oct. 6, 1951
3 Sheets-Sheet 1
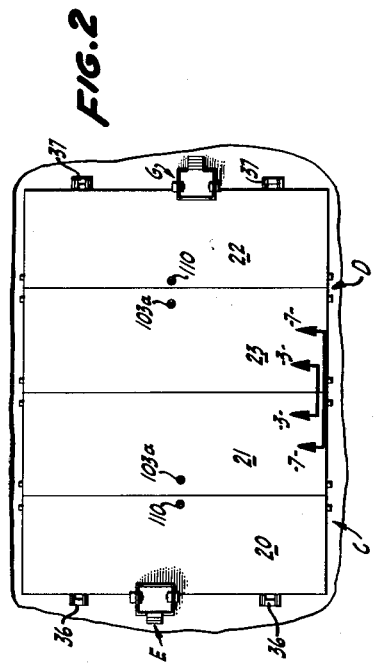
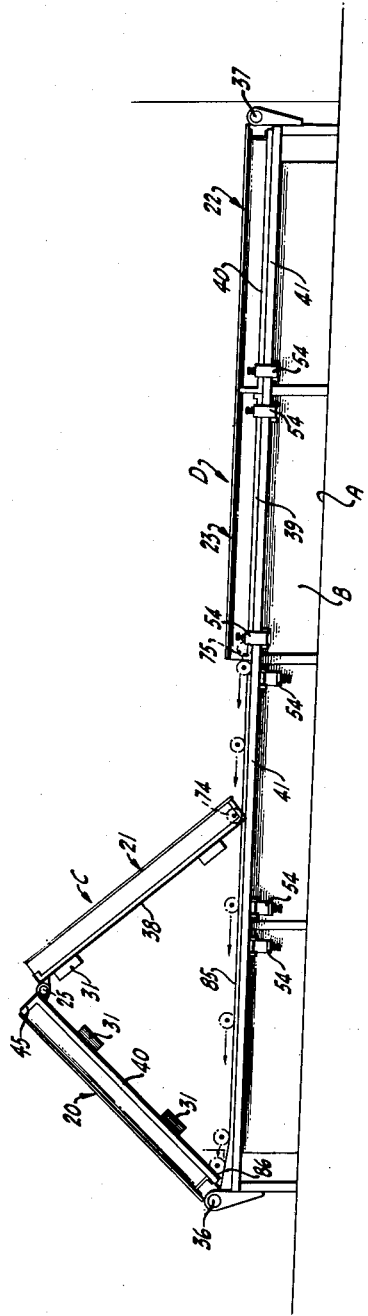
INVENTOR.
ALFRED B. SABIN
BY
*Mellin and Hanson*
ATTORNEYS July 10, 1956 — A. B. SABIN — 2,753,827
SHIP HATCH COVER STRUCTURE
Filed Oct. 6, 1951 — 3 Sheets-Sheet 2
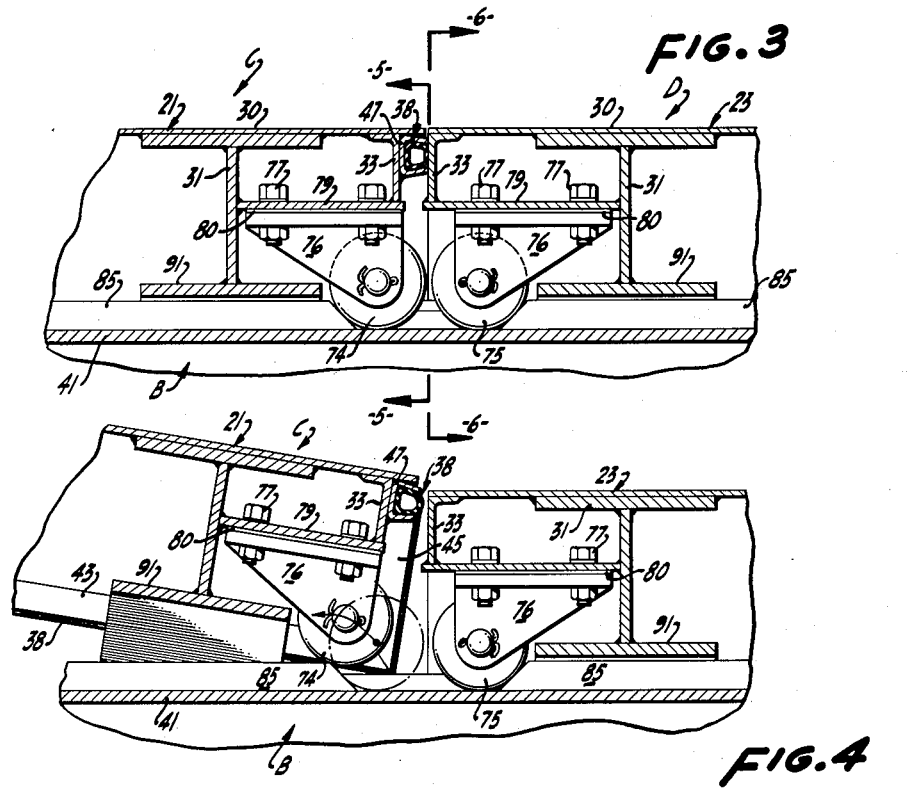
FIG. 3
FIG. 4
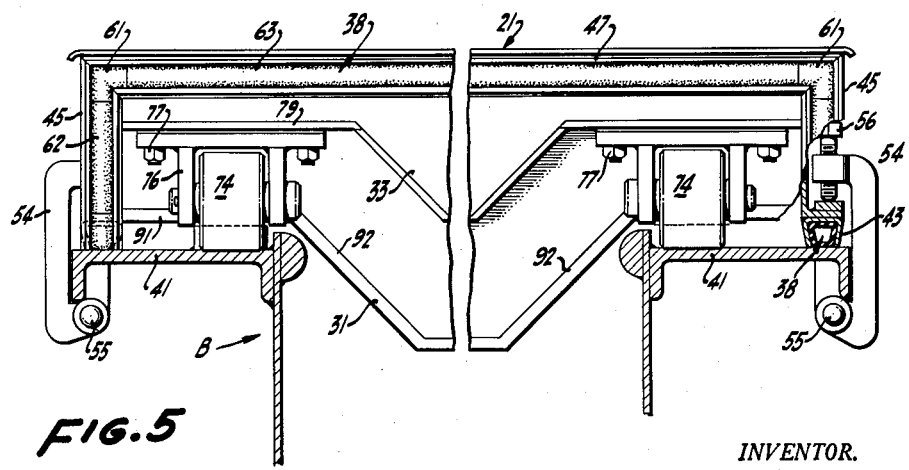
FIG. 5
INVENTOR.
ALFRED B. SABIN
BY
Mellin and Hanson
ATTORNEYS July 10, 1956  A. B. SABIN  2,753,827
SHIP HATCH COVER STRUCTURE
Filed Oct. 6, 1951  3 Sheets-Sheet 3
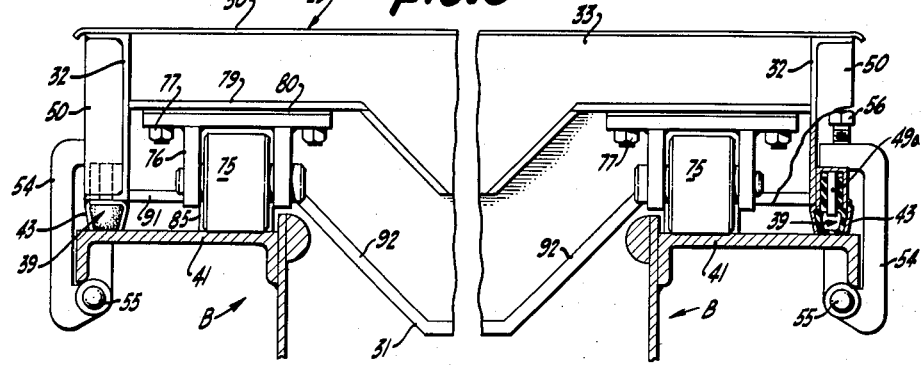
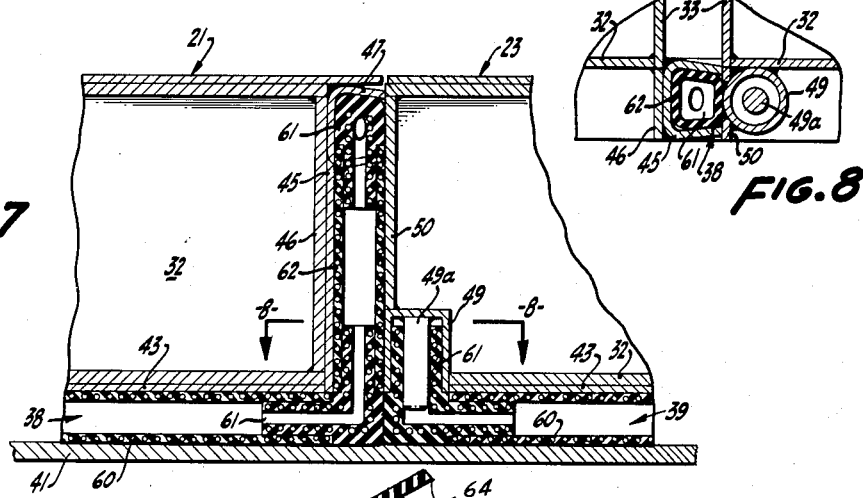
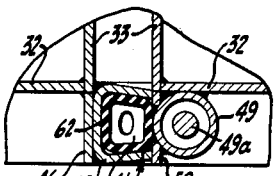
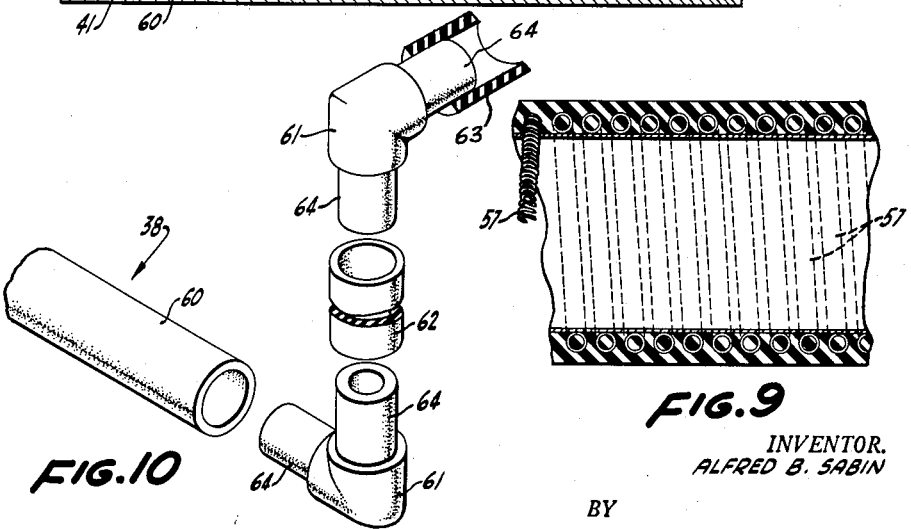
INVENTOR.
ALFRED B. SABIN
BY
Mellin and Hanson
ATTORNEYS

United States Patent Office 2,753,827
Patented July 10, 1956

2,753,827
SHIP HATCH COVER STRUCTURE

Alfred B. Sabin, Oakland, Calif., assignor to Alvin R. Campbell Co., Inc., San Francisco, Calif., a corporation of California Application October 6, 1951, Serial No. 250,118

1 Claim. (Cl. 114—201)

This invention relates to a ship hatch structure and particularly to an improved ship hatch cover.

There is at present considerable difficulty in providing an effective seal between the hatch cover and the coaming on a ship's deck. The main object of the present invention is to provide a hatch structure including a novel hatch cover carrying a special sealing gasket so mounted and constructed that it will be effective to seal over long periods of time and which hatch structure is so designed that the gasket will not be scuffed or worn during manipulation of the hatch cover.

A further object of the present invention is to provide a hatch cover having a gasket so supported and carried by the hatch cover that the amount of deformation thereof is limited.

Various other objects of the present invention will be apparent from the following description taken in conjunction with the accompanying drawings, wherein:

Fig. 1 is a view in elevation showing a hatch structure embodying the concepts of the present invention mounted on a ship's deck.

Fig. 2 is a fragmentary plan view showing the two hatch covers in closed position.

Fig. 3 is a fragmentary longitudinal sectional view taken along line 3—3 of Fig. 2.

Fig. 4 is a view similar to Fig. 3 with the lefthand or fore hatch being shown in partly folded position.

Fig. 5 is a cross-sectional view taken along the line 5—5 of Fig. 3, showing an end view of the fore hatch cover.

Fig. 6 is a cross-sectional view taken along the line 6—6 of Fig. 3, showing an end view of the aft hatch cover.

Fig. 7 is a fragmentary longitudinal sectional view taken along line 7—7 of Fig. 2, showing the meeting edges of the fore and aft hatch covers and a portion of the composite gasket carried by each hatch cover.

Fig. 8 is a fragmentary horizontal sectional view taken along the line 8—8 of Fig. 7.

Fig. 9 is a fragmentary longitudinal sectional view through a tubular gasket section, showing the incorporation of a spring therein.

Fig. 10 is an exploded perspective view of a portion of a composite gasket showing the manner in which the gasket sections are fitted together.

Referring to the accompanying drawings, wherein similar reference characters designate similar parts throughout, the construction shown includes a deck A which is inclined from the left or fore to the right or aft as the parts are depicted in Fig. 1 and this deck includes a coaming generally entitled B which defines a hatchway, the hatchway being adapted to be closed by a fore foldable hatch cover generally entitled C and an aft foldable hatch cover generally entitled D.

Each of the hatch covers is similar in construction and includes two main sections, 20 and 21 in the case of hatch cover C and 22 and 23 in the case of hatch cover D. Sections 20 and 21 are pivotally connected together at 25 (see Fig. 1) and sections 22 and 23 are similarly pivotally connected together by a pivot not shown. Each of the hat cover sections takes the general form of inverted box frame construction including a cover plate 30, transversely arranged I-beam girders 31, longitudinally arranged channels 32 and transversely extending channels 33 (compare Figs. 3 and 6) and other minor parts to be described more in detail hereinafter.

Section 20 of hatch cover C and section 22 of hatch cover D are pivotally mounted at 36 and 37 respectively to the ends of the coaming as clearly shown in Fig. 1. The axis of each pivot is located substantially in the plane of the cover plate 30 of its section. By this construction, the folded or stowed hatch covers can be moved to unfolded and operative position by a relatively small force since major parts of each hatch cover are disposed forwardly of its axis of swing when the hatch covers are in folded or stowed condition.

Each of the sections of the hatch covers is provided with a composite gasket, therearound, the composite gaskets being designated by the reference numerals 38 for hatch cover sections 21, 39 for hatch cover section 23 and 40 for hatch cover sections 20 and 22. These composite gaskets are adapted to seat against a flange 41 provided about coaming B and against opposed end faces of adjacent sections as will be explained.

Composite gasket 38 for hatch cover section 21 is generally U-shaped in plan and is carried by said section in the following manner. There are inverted longitudinally extending gasket keeper channels 43 secured to the bottoms of frame channels 32 (see Fig. 5) for supporting composite gasket 38 at the sides of section 21. At the righthand end of section 21, for reasons to be explained, the gasket 38 is directed upwardly along the end face of section 21 by vertical keeper channels 45 secured to end plates 46 fixed to the ends of frame channels 32, and across the end face by a transverse keeper channel 47 fixed to the back of frame channel 33 at the end face. At the opposite end face of section 21, gasket 38 has upwardly extending terminals, the construction of which is best explained by describing the terminals of composite gasket 39 for hatch cover section 23.

Gasket 39 is composed of two unjoined separate identical members supported along the sides of section 23 by gasket keeper channels 43 (see Fig. 7). There are inverted cups 49 secured in the corners to snugly receive the reduced ends of the members of tubular composite gasket 39, said cups having pins 49a snugly receivable in the ends of gasket 39. Cups 49 are fastened at the corners by being welded to end plates 50 and the lower legs of frame channels 32. The terminals of U-shaped composite gasket 38 are similarly secured to the lefthand corners of hatch cover section 21.

Gaskets 40 for hatch cover sections 20 and 22 are in the form of rectangular loops in plan and are identical and are carried by their sections at the sides in gasket keeper channels 43, at the remote ends by transverse gasket keeper channels 47 and vertical gasket keeper channels 45.

When the hatch covers C and D are closed, the gaskets are adapted to seal against the flange 41 of the coaming and between the ends of the hatch cover sections to form an effective seal. Between the sections, the upwardly extending portions of gaskets 38 and 40 are adapted to seal against the backs of transverse frame channels 33, end plates 50, cups 49 and the terminals of the adjacent gaskets, as best shown in the case of gasket 38 in Figs. 3, 7 and 8. The gaskets, therefore, are adapted to seat against a flat metal surface at every place except where the terminals of gaskets 38 and 39 abut the adjacent gaskets.

The gaskets are adapted to be compressed against flanges 41 of coaming B by swinging clamps 54 swingably mounted on the coaming at 55 and provided with clamping screws 56 which are adapted to engage the bottom legs of frame channels 32, as shown in Fig. 5. When the clamps 54 are swung to inoperative position, they are swung beneath the flanges 41 of the coaming B and therefore are disposed in an out-of-the-way position.

Each of the gasket keeper channels has inwardly converging sides as clearly shown in Fig. 5 so as to retain the tubular gaskets therein. There is sufficient space in the channels to allow the gaskets to be compressed and accommodated within the channels as best appreciated by comparing Figs. 4 and 5. The gaskets protrude somewhat from the channels, this construction allowing the gasket material to seat and seal and yet limiting the amount of deformation of the gaskets as clearly shown in Fig. 5. If unlimited deformation of the gaskets was allowed, the life of these gaskets would be materially decreased and by applicant's construction the life of these gaskets is prolonged.

The gaskets preferably have incorporated in the walls thereof coiled springs 57 for the purpose of increasing the life of the gaskets and their ability to return to their original shape after being deformed for long periods of time, such as would occur during a voyage. Instead of springs, an elastic core could be provided for the tubular gasket to maintain the resiliency thereof. As shown in Fig. 10, a composite gasket comprises relatively long longitudinally extending tubular sections 60, elbows 61, short vertical tubular sections 62, and transverse section 63. Elbows 61 have reduced ends 64 receivable in sections 60, 62 and 63 to produce a composite gasket of uniform diameter throughout its length. The reduced ends 64 of the elbows are receivable in cups 49 at the ends of the composite gaskets.

As clearly shown in Fig. 7, the coiled springs 57 in the elbows 61 extend through the wall portions of the elbows defining the corners of the elbows to make the entire elbow spring resilient. It is here pointed out that reliance is placed on the resiliency of the coiled springs to enable the gasket sections to return to their original form after being deformed, although the natural resiliency of the rubber or like material obviously assists the sections in returning to their original form.

There are pairs of wheels provided at the forward adjacent ends of sections 21 and 23 of the hatch covers, said wheels being given the reference numerals 74 for section 21 and 75 for section 23. The wheels are rotatably mounted by wheel mounting brackets 76 secured by nuts and bolts 77 to plates 79 secured to girders 31 and channels 33 in the following manner: The channels 33 are recessed at the outer ends thereof (see Figs. 5 and 6) and plates 79 are welded to the lower ends of channels 33 and to the mid-sections of I-beams 31 (see Fig. 3).

Since the gaskets must be allowed to engage flanges 41 of the coaming B in order to form an effective seal, the gaskets must protrude below the peripheries of the wheels 74 and 75. There are shims 80 between the brackets 76 and plates 79 to position the peripheries of the wheels approximately flush with the bottom edges of gasket keeper channels 43 to allow effective engagement of the gaskets and said flange.

In order to avoid scuffing or wear of the gaskets during movement of the hatch covers from unfolded to folded positions, or vice versa, suitable ramps 85 are provided (compare Figs. 3 and 6) which extend along and are secured to flange 41 of the coaming. These ramps are arranged, as shown in Figs. 3 and 4, to allow the gaskets to engage flange 41 when the hatch covers are fully closed, but, as soon as the hatch covers are moved toward their inoperative, folded or stored position, the wheels ride up on ramps 85. It is pointed out that by arranging gasket 38 of section 21 to extend upwardly at the righthand end thereof as shown in the drawings, the major part of the gasket is disposed in a position where it is least likely to be scuffed during folding since it is the bottom edge of said end which travels closest to flange 41 during folding of the hatch cover.

Furthermore, such construction provides clearance for wheels 74 to allow said wheels to be mounted on said end of section 21 at the furthest outward position so as to effectively space the elbows of gaskets 38 from flange 41 during folding. In order to avoid scuffing during the last increment of folding movement (see Fig. 1), a second inclined portion 86 is provided on each ramp so as to space the entire portion of the gasket 38 across the lefthand end of section 21 clear of flange 41 and the ramp itself. A similar construction for hatch cover D is likewise provided but for the purpose of protecting the lefthand terminals of gasket 39 since there are no transverse portions of gasket 39 across the ends of hatch cover section 23.

The central portions of I-beam girders 31 extend below the upper edges of coaming B. The ends of the I-beams are suitably recessed and provided with horizontally disposed plates 91 and inclined plates 92 at the outer edges thereof to clear ramps 85, as best shown in Fig. 3.

By the present invention, an improved ship hatch structure has been provided which includes a novel hatch cover, including a special seal which is an effective seal between the hatch cover and the coaming and is adapted to be moved from its closed or folded position to its operative and closing position without scuffing or wearing of the gasketing material.

Having thus described my invention, what I claim and desire to secure by Letters Patent is:

A device of the character described comprising: an upstanding rectangular hatchway coaming provided along its upper peripheral edge with a continuous outwardly extending peripheral flange serving as hatch cover section seats; first and second hatch cover sections of inverted box frame construction mounted over said peripheral flange end to end, each of said hatch covers including opposed inner and outer end walls and opposed side walls, the respective inner end walls of said hatch cover sections being immediately adjacent each other; downwardly facing gasket channels secured to and along the lower edges of the side walls of each hatch cover section; an inwardly facing gasket channel secured to and along the upper edge of the inner end wall of said first hatch cover section, inwardly facing corner gasket channels secured to and along the vertical corners of the inner end wall of said first hatch cover section and forming a continuation of the side and end gasket channels of said first hatch cover section; a continuous tubular elastomer gasket accommodated within the gasket channels of said first hatch cover section; tubular elastomer gaskets accommodated within the gasket channels of said second hatch cover section, the gaskets on the end wall of said first hatch cover section being arranged to effect a watertight seal between said contiguous end walls along their upper and vertical edges and the inner ends of the gaskets of said second hatch cover section being arranged to effect a watertight seal with the gaskets of said first hatch cover section and with said peripheral flange of said coaming; each of said tubular gaskets including molded elbows having reduced portions fitting within the tubular sections, thereby to provide a gasket of uniform diameter throughout its length.

References Cited in the file of this patent

UNITED STATES PATENTS

| | | |
|---|---|---|
| 691,752 | Dawley | Jan. 28, 1902 |
| 1,206,230 | Kincaid | Nov. 28, 1916 |
| 1,759,685 | Brucker | May 20, 1930 |
| 1,918,134 | Resch | July 11, 1933 |
| 2,093,362 | Nelson | Sept. 14, 1937 |
| 2,139,780 | Tea | Dec. 13, 1938 |
| 2,195,046 | Best | Mar. 26, 1940 |
| 2,385,156 | Newell | Sept. 18, 1945 |
| 2,390,372 | Johnston et al. | Dec. 4, 1945 |
| 2,535,634 | Hubbard | Dec. 26, 1950 |
| 2,551,563 | Jepson | May 1, 1951 |